July 9, 1963
R. A. SHEFKE
3,096,863
CLUTCH OR BRAKE EMPLOYING CAM ACTION
Filed Oct. 28, 1959
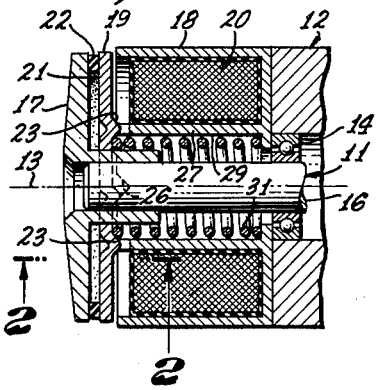
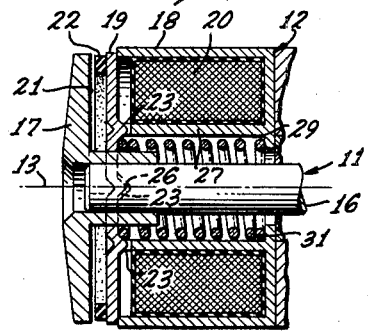
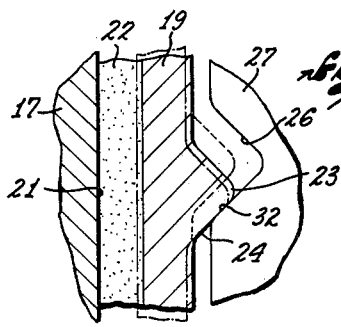
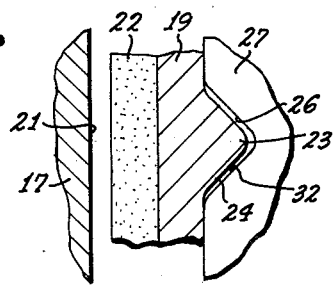
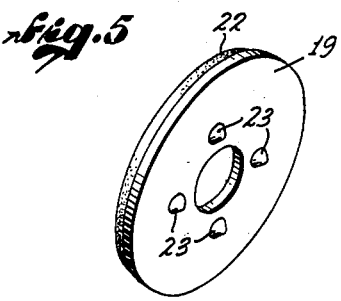
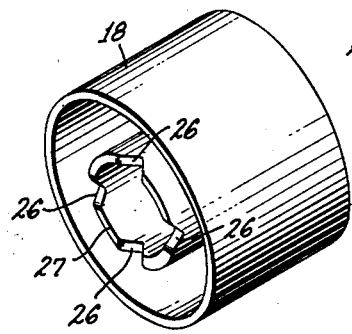
ROBERT A. SHEFKE,
Inventor.
HERZIG & JESSUP,
Attorneys.
By Warren T. Jessup

United States Patent Office 3,096,863
Patented July 9, 1963

3,096,863
CLUTCH OR BRAKE EMPLOYING CAM ACTION
Robert A. Shefke, Los Angeles, Calif., assignor to American Electronics, Inc., Los Angeles, Calif., a corporation of California
Filed Oct. 28, 1959, Ser. No. 849,231
2 Claims. (Cl. 192—90)

This invention relates to clutch means which may be employed either as a brake to quickly stop the rotation of a shaft, or in more conventional clutch fashion, as a means for clutching together two relatively rotatable members, each of which is also rotatably mounted with respect to a frame or housing.

It is an object of this invention to provide clutching means for achieving an extremely fast clutching action between two relatively rotatable members.

It is another object of this invention to provide a clutching means which brings into play inter-engaging braking or clutching forces that are very high relative to the clutching forces which initiate the braking action.

It is a further object of this invention to provide a rapid clutch means which may be employed in a clutch-fashion or as a brake, which employs cam action to rapidly multiply the clutching or braking force.

It is a further object of this invention to provide a clutching means which has relatively few parts and is simple to fabricate and assemble.

It is a further object of this invention to provide clutching means which is uniquely adaptable for use in bringing a small electric motor to a rapid halt.

It is a further object of this invention to provide a clutching means for use as a brake or clutch which has a very long life for the clutch faces, because of the fast clutching or stopping time which eliminates prolonged relative sliding.

In accordance with these and other objects which will become apparent hereinafter, a preferred form of the present invention will now be described wherein:

FIG. 1 is a cross-sectional view showing the clutch means in engaged or braked position;

FIG. 2 is a fragmentary section taken on line 2—2 in FIG. 1;

FIG. 3 is a cross-section similar to FIG. 1, illustrating the mechanism in declutched position;

FIG. 4 is a view similar to FIG. 2, illustrating the parts in the position shown in FIG. 3;

FIG. 5 is a perspective view of one of the parts of the present invention, namely the intermediate clutch plate; and FIG. 6 is a perspective view of another one of the parts of the present invention, namely the casing for the magnetic actuating coil.

Referring to the drawing, the clutch or coupling structure of the present invention is shown in the form of a pair of members 11 and 12 which are mounted for rotation relative to each other about a given axis 13, by means of a bearing 14. Each may, if desired, be also mounted for rotation about the axis 13 with respect to a stationary frame or housing (not shown). In this event, the structure or mechanism serves as a clutch to couple the two rotating members 11 and 12 together. For simplicity of description, however, the structure will be described as a brake, in which the member 12 is stationary, and forms a base with respect to which the member 11 rotates.

The member 11 comprises a shaft 16 to the end of which is fitted by press fit, spline, or otherwise, circular plate or disc 17. To the base member 12 and circumjacent the shaft 16 is secured an annular coaxial housing 18 having an annular chamber within which a coil 20 is disposed, with the turns of the coil being wound coaxially around the axis 13.

Intermediate the disc 17 and the housing or case 18 and circumjacent shaft 16 is a substantially flat annular coupling disc 19, which is free to move axially back and forth between the disc 17 and the housing 18. The inner face 21 of the disc 17 constitutes a clutching face adapted to be engaged by an annular brake band 22 bonded to the facing surface of the intermediate disc 19.

The shaft 16 and disc 17 rotate freely with respect to the intermediate disc 19, except when frictionally clutched thereto by engagement of the brake band 22. The intermediate disc or plate 19 is limited in its rotation with respect to the housing 18 by the engagement of four protuberances or tips 23 which are generally conical in shape and form sloping faces exemplified by the face 24. The protuberances 23 reside in correspondingly shaped triangular recesses or notches 26 formed in the edge of the inner cylindrical wall 27 of the housing 18.

When the brake is in disengaged position, the plate 19 is held to the right (FIG. 3), so as to keep the annular brake band 22 out of friction engagement with the braking face 21 on the disc 17. This is effected by energizing of the coil 20, which attracts the plate 19, since the latter is made of paramagnetic material. In this position, illustrated in FIGS. 3 and 4, the shaft member 11 is free to rotate freely, uninhibited by any braking action.

Within an annular well 29 formed in the housing 18 contiguous to the shaft 11 resides a helical compression spring 31 which biases the plate 19 continually outward into engagement with the disc 17. When energized, the coil 20 retracts the plate 19 against the bias of the spring 31. When the coil is de-energized, the spring 31 presses the plate 19 outwardly until the brake band 22 engages the braking face 21 on the disc 17 (FIG. 1).

Upon such engagement, the circumferential frictional drag between the disc 17 and the band 22 causes the disc or plate 19 to be rotated around the shaft 11. Such rotation brings into play a cam action between the cam surface 24 of the tit 23 and the engaging cam surface 32 of the recess 26. As a result, the intermediate plate 19 tends to be drawn away from the housing 18 by the cam action, as shown in FIG. 2. The axial component of this motion forces the band 22 into tighter engagement with the inner face 21 of the disc 17. This in turn increases the frictional drag and tends to press the disc 19 even harder against the disc 17.

The cumulative result is a very fast wedging and braking action the moment the brake band 22 first engages the braking face 21. As a result, there are engendered very great axial braking forces far exceeding the compressive force of the spring 31. These braking forces are proportional to the rotational momentum of the member 11, and hence proportional to the velocity of the member 11. Since the braking force varies directly with the velocity of the member 11, the brake serves to quickly stop the member 11, even though it may be rotating at very high velocity when the coil 20 is de-energized.

When the coil 20 is re-energized, the plate 19 retracts and the tits 23 reseat in the notches 26, the plate 19 turning slightly by the resulting cam action.

It will be noted that the tits or protuberances 23 and their respective recesses 26 are spaced equi-angularly about the axis 13. In the embodiment shown, four such protuberances 23 have been employed, but it will be understood that any plurality of such protuberances may be employed.

From the above description, it will be noted that the simplicity of this structure results in a positive braking which is unequivocally cumulative. That is to say, once the brake band 22 has frictionally engaged the braking face 21, the axial braking force must increase, until the member 11 is brought to an absolute halt with respect to the member 12. This is because the circumferential frictional drag of the disc 17 on the plate 19 positively serves to drive the tits 23 out of the recesses 26, and this can have no other result than to increase the frictional engagement between the band 22 and the face 21. Cumulatively, this increase in frictional engagement must correspondingly tend to drive the tits or protuberances 23 further out of the recesses 26. As a result, the braking action is always cumulative and proportional to the speed of the shaft member 11.

While the instant invention has been shown and described herein in what is conceived to be the most practical and preferred embodiment, it is recognized that departures may be made therefrom within the scope of the invention which is therefore not to be limited to the details disclosed herein, but is to be afforded the full scope of the claims.

What is claimed is:

1. Means for clutching together two members and comprising: a pair of members mounted for rotation relative to each other, one of said members comprising a shaft disposed on the axis of relative rotation, the other member comprising an annular member coaxially circumjacent said shaft, disc means secured to said shaft, a first cam member fixedly mounted with respect to said annular member, said disc means and first cam member being fixed against relative axial movement, a second cam member in the form of a clutching plate disposed between said disc means and said first cam member and mounted for limited rotative and axial movement with respect to said first cam member, one of said cam members having a plurality of sloped protuberances, and the other of said cam members having a corresponding plurality of sloped recesses receiving said protuberances, said protuberances and recess being substantially equi-angularly spaced around said axis, and means for selectively moving said clutching plate toward and away from said disc means into selective clutching engagement and disengagement with respect thereto.

2. Clutching mechanism in accordance with claim 1, wherein said last-named means comprises the combination of spring means for biasing said clutching plate toward said disc means, and electromagnetic means for moving said clutching plate away from said disc means in opposition to said spring means.

References Cited in the file of this patent

UNITED STATES PATENTS

| | | |
|---|---|---|
| 1,882,805 | Gillett | Oct. 18, 1932 |
| 2,023,690 | Lyman | Dec. 10, 1935 |
| 2,578,715 | Mason | Dec. 18, 1951 |
| 2,623,619 | Clerk | Dec. 30, 1952 |
| 2,757,768 | Landerer | Aug. 7, 1956 |
| 2,861,665 | Passler | Nov. 25, 1958 |
| 2,866,528 | Jacobs | Dec. 30, 1958 |
| 2,888,115 | Knittel | May 26, 1959 |
| 2,930,457 | Bigelow | Mar. 29, 1960 |
| 2,983,339 | Neff | May 9, 1961 |